July 16, 1957  C. G. B. BERGLING ET AL  2,799,073
DISMOUNTABLE MOULD, PARTICULARLY FOR THE MANUFACTURE
OF BUILDING STONES FROM POROUS CONCRETE
Filed Dec. 4, 1953  2 Sheets-Sheet 2

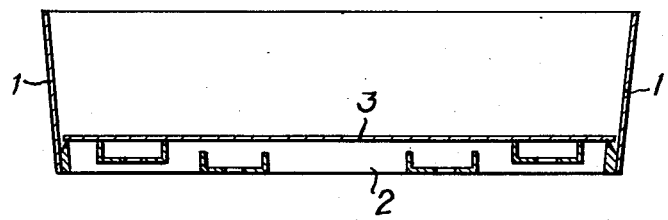
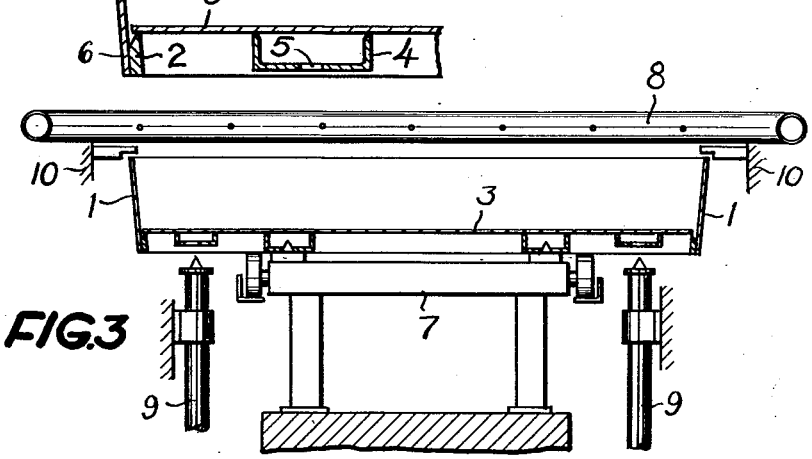
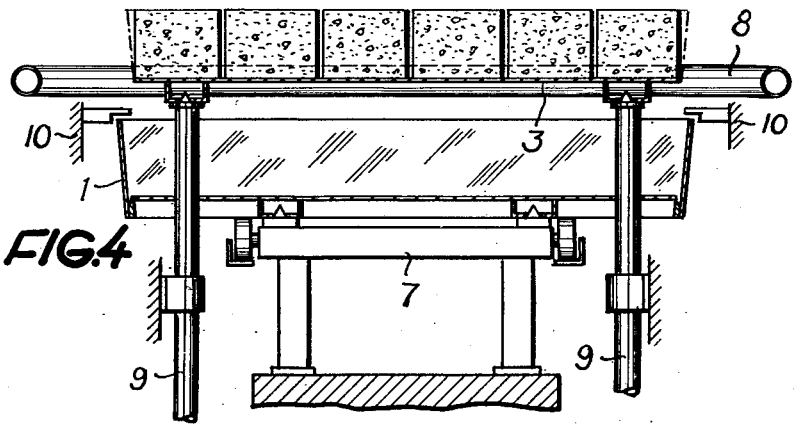

INVENTOR

BY

ATTORNEY

United States Patent Office 2,799,073
Patented July 16, 1957

2,799,073

DISMOUNTABLE MOULD, PARTICULARLY FOR THE MANUFACTURE OF BUILDING STONES FROM POROUS CONCRETE

Charles Gunnar Birger Bergling and Karl Aldo Ludvig Bergling, Orebro, Sweden, assignors to Durox International Societe Anonyme, Luxembourg, Luxembourg, a corporation of Luxembourg Application December 4, 1953, Serial No. 396,151

Claims priority, application Sweden December 9, 1952

2 Claims. (Cl. 25—121)

Artificial building stones are generally manufactured from slate and lime with the admixture of water and aluminum powder as a fermentation agent. The mass thus obtained is cast into moulds from wood or sheet-iron. If the manufacture is operated on a large scale, moulds from sheet-iron are generally made use of, because such moulds are more resistive and may be given a more manageable shape. The present invention refers to a mould of the latter type with dismountable walls and a dismountable bottom, and is distinguished by great simplicity and convenience in use. The mould according to the invention is principally characterized by the provision, at the lower edges of the walls and at the edges of the bottom, of a supporting band, by which the bottom is carried.

According to the invention, the walls are also made sloping toward the bottom, and may then take the shape of a frustrated pyramid with the apex thereof directed either downwardly or upwardly. According to the invention, the mould is also constructed so that a tightening pocket for oil, for example, is formed along the borders of the bottom.

Figure 5:
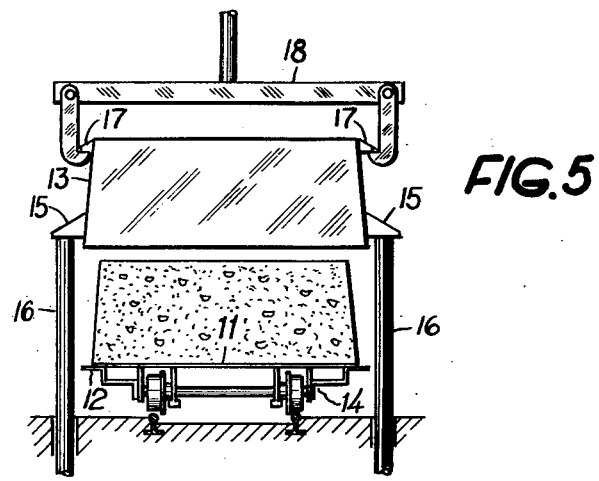
Figure 6:
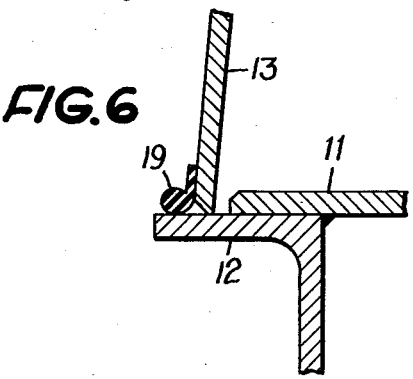
Figure 7:
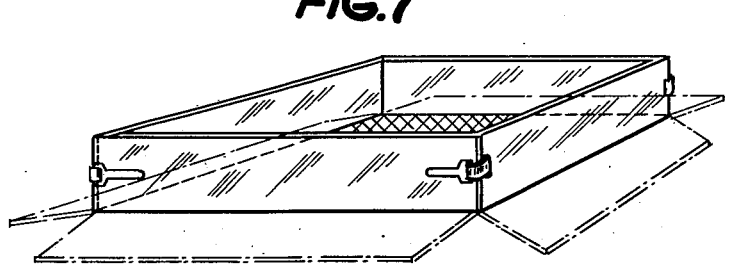

A few examples of embodiment of the mould according to the invention will be described hereinbelow with reference to the accompanying drawings, wherein Fig. 1 shows the mould in a longitudinal section, Fig. 2 shows a detail of the bottom to a larger scale, Fig. 3 shows a cross-section of the mould with the bottom resting on a supporting band, and Fig. 4 shows the same arrangement with the bottom raised. Fig. 5 shows a modified embodiment of the mould in a longitudinal section, Fig. 6 shows a detail of the bottom of the modified embodiment to a larger scale, and Fig. 7 showing a mould of an older type with walls adapted to be lowered, and with locking means for the corners thereof.

The mould according to Figs. 1–4 consists of two principal parts, the wall section 1 and the bottom plate 3. Secured to the lower edge of the wall section is a supporting band 2 serving as a support for the bottom plate 3, when the latter is in its lower position. Between the wall 1, the band 2 and the bottom 3 there is formed a pocket 6 to collect lubricating oil coming from the mould, said pocket thus forming a tightening means round the bottom plate against the walls. The walls preferably slope at an obtuse angle of approximately 93° to the bottom, in order that the moulded mass shall readily come loose from the walls, when the hardened mass is raised out of the mould to be sawed or cut. The bottom is moved in a vertical direction by means of vertically guided lifters 9 with studs arranged in apertures 5 in bracing girders 4.

With the bottom resting on the supporting band 2, a mass is filled in to a suitable depth in the mould, whereupon the latter is moved to a fermentation chamber, wherein the mass will ferment by degrees so as to fill the mould in its entirety. The mass will then have acquired a more solid state, but is still rather wet. From the fermentation chamber the mould is moved to the conveying band 7 adapted to convey the mould to the saws or cutting machines 8, where it is stopped in a definite position above a lifting device 9, which then lifts the bottom 3 with the mass upwardly toward the saw wires or the cutting blades. The wall section 1 is left to stay in its position and does not follow up with the lifters 9. An additional stop abutment 10 prevents the wall section from being entrained should the latter have become sucked fast to the mass for some reason or another.

When the sawing or cutting is terminated, the lifters 9 are lowered, the bottom 3 with the mass then reassuming its position in the wall section, which is now conveyed off together with the mass to be hardened. The pocket 6 between the bottom plate 3 and the wall 1 effectively aids to the tightening effect between the two principal parts of the mould. When the mould is oiled, prior to casting, the oil flows off the walls to the pocket, wherein it forms an oil seal. The oil also prevents the moulded material from sticking to the packing in the hardening operation.

In the manufacture of porous concrete, it has been found desirable to shorten the hardening time for the mass. The bottom and walls of the mould, which are made from sheet-iron, must be made strong because of the great weight of the mass. Out of the total weight about 50% come on the walls. The more iron there is to follow with the mass into the digesters, the longer is the time consumed to bring about the proper pressure and temperature in the digesters.

In the embodiment according to Figs. 5 and 6, the walls are removed from the mould bottom, before the mass is conveyed into the digesters, whereby the heating proceeds more rapidly in the digesters. According to Figs. 5 and 6, the bottom 11 is provided round the edge thereof with an L-iron 12 welded to the lower side thereof, the horizontal shank of which projects for a distance out from the edge of the bottom. In this case, the mould walls 13 slope at an acute angle, preferably about 87°, to the bottom, in order that the moulded mass shall readily come loose from the walls without being torn to pieces. The bottom 11 rests on a carriage 14, by means of which the mould is moved between the various phases in the manufacture. The walls are provided on the outside at the lower edge thereof with projecting brackets 15, by means of which the walls may be raised from the mould by vertical lifters 16. In the upper edge, the walls are provided on the outside thereof with lifting members 17, by means of which the walls may be conveyed off in a lifting contrivance 18.

By the use of moulds according to Figs. 5 and 6, the transports of mould bottoms and mould walls may be adapted in such manner that a small number of mould walls will be required. As an example, it might be mentioned that in moulds of the previously known type that followed with the mass during the moulding, fermentation and hardening of the same, 400 moulds were required in a certain manufacture, whereas with the construction according to Figs. 5 and 6 only 400 mould bottoms and approximately 70 mould walls are required. As the moulds constitute one of the greatest investments in a factory of this kind, the costs of the manufacture will thus be lowered. The mould walls maintain an ordinary room temperature all the time. Hereby it will be possible to provide the mould walls on the outside thereof with a rubber packing 9 affording a tightening effect against the L-iron 12, whereby an additional security is obtained for the tightening of the oil seal. The transports in the factory also become simpler, and only one lifting operation is required for the mould walls 13. Particularly where larger and longer moulds are brought into consideration, as is the case in the manufacture of roof plates, this type of mould is to be preferred.

What we claim is:

1. A dismountable mould, especially for the manufacture of building blocks from porous concrete; said mould comprising two separable parts defining the side walls and bottom of the mould respectively and being of a shape so that said bottom can fit within the lower portion of the part defining the side walls with a substantial lateral clearance remaining between the adjacent edges of said side walls and bottom, and a supporting band disposed on said part defining the side walls at the inside of the latter along the lower edge of the latter so that the peripheral edge of said bottom can seat upon said band, the upper edge of said band defining an upwardly opening pocket disposed beneath the upper edge of said supporting band, the opposite inside surface of the mould and an inside surface of the band providing the side walls of said pocket.

2. A dismountable mould according to claim 1, wherein said inside surface of the band is provided by the upper edge of said band sloping downwardly in the direction towards the inner surface of the side walls of the mould to trap the excess of a lubricant flowing downwardly on said inner surfaces of the mould.

References Cited in the file of this patent

UNITED STATES PATENTS

| Number | Name | Date |
|---|---|---|
| 205,569 | Nagle | July 2, 1878 |
| 378,716 | Peirce | Feb. 28, 1888 |
| 430,752 | Raymond | June 24, 1890 |
| 703,081 | Palmer | June 24, 1902 |
| 757,726 | Crapp | Apr. 19, 1904 |
| 765,349 | Wilson | July 19, 1904 |
| 796,939 | Schwerdtfeger | Aug. 8, 1905 |
| 978,600 | Lampman | Dec. 13, 1910 |
| 1,166,312 | Barten | Dec. 28, 1915 |
| 1,634,740 | Dale | July 5, 1927 |
| 1,767,163 | Ackermann | June 24, 1930 |
| 2,495,100 | Henderson | Jan. 17, 1950 |